Feb. 27, 1962 L. D. PADULA 3,022,799
ELECTROMAGNETIC VALVE
Filed Oct. 22, 1959

INVENTOR.
LAWRENCE PADULA
BY
*Lindsey and Prutzman*
ATTORNEYS

United States Patent Office 3,022,799
Patented Feb. 27, 1962

3,022,799
ELECTROMAGNETIC VALVE
Lawrence Dominic Padula, New Britain, Conn., assignor to Skinner Precision Industries, Inc., New Britain, Conn., a corporation of Connecticut
Filed Oct. 22, 1959, Ser. No. 848,021
3 Claims. (Cl. 137—625.27)

This invention relates to an improved solenoid valve of the three way type wherein a reciprocal plunger controls the opening and closing of the valve ports.

It is a general object of this invention to provide an improved three way solenoid-operated valve which permits removal of the solenoid without disturbing any of the connections to the valve ports, which utilizes a symmetrical magnetic circuit to simplify construction of the valve and which is extremely economical to manufacture and reliable in operation.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
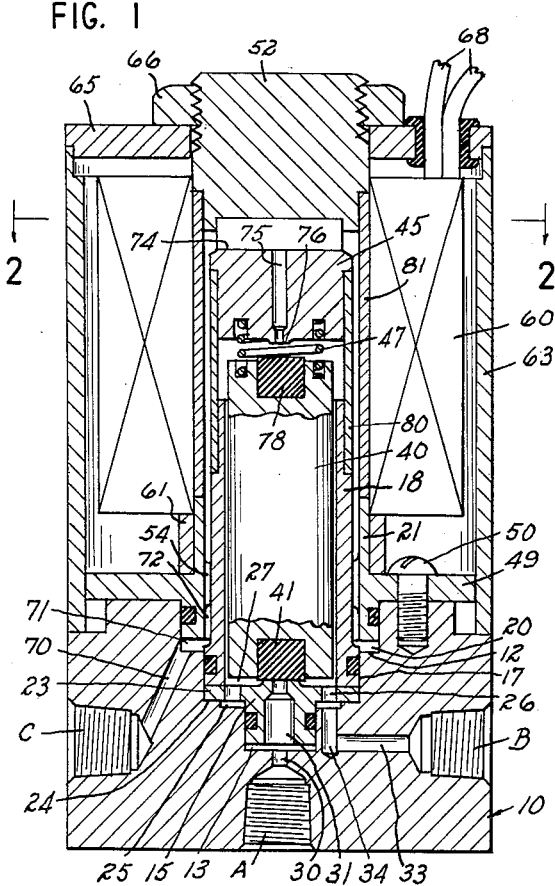
FIG. 1 is a longitudinal cross section view of the preferred embodiment of my improved three way valve.
Figure 2:
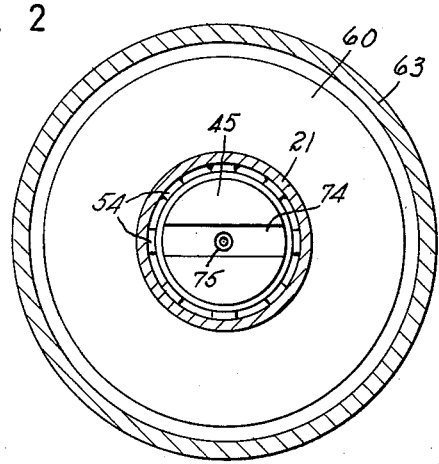
FIG. 2 is a cross section view of the valve of FIG. 1 taken generally along the line 2—2.

Conventional three way valve structures have located two of the valve ports in the lower portion of the housing or base and have located the third valve port on the top of the housing above the solenoid so that removal of the solenoid for any reason has necessitated removal of the connections to the third port. Some efforts have been made to avoid this disadvantage but the structures resulting from these efforts have generally introduced a high degree of complexity and cost.

As seen in the drawings, the improved valve structure of this invention locates all three valve ports in the base portion of the valve and utilizes an inexpensive and durable structure which does not interfere with removal of the solenoid. Base or body member 10 is provided with a central recess 12 having a lower portion 13 in which is disposed valve seat 15, a middle portion 17 in which inner tube 18 is positioned and an upper portion 20 in which outer tube 21 is positioned. Valve seat 15 is arranged in sealing engagement with the side walls of recess portion 13 and is provided with a radially extending rim 23 that is trapped between shoulder 24 on base 10 and the lower end of tube 18 to define an annular passageway 25 which communicates with the interior tube 18 through a plurality of passageways 26 in rim 23. Port A is drilled or otherwise formed in body 10 and communicates through drilled passageway 30 in body 10 and passageway 31 in valve seat 15 with the interior of tube 18. Port B is drilled or otherwise formed in body 10 and is connected to annular passageway 27 by drilled passageways 33 and 34.

Plunger or armature 40 is positioned within tube 18 for reciprocal movement and, in the illustrated preferred embodiment, has a diameter smaller than that of tube 18 to permit fluid flow through tube 18 and around the plunger as hereinafter described. A soft insert 41 of rubber or the like is disposed at the lower end of plunger 40 for engagement with valve seat 15 so as to control communication between port A and port B.

Tube 18 sealingly engages recess portion 17 in base 10 and is closed at its upper end by plug 45. Plug 45 is provided with an annular groove in which is disposed spring 47 that bears against the upper end of plunger 40 to urge insert 41 into engagement with valve seat 15 thereby to establish a normally closed valve position in the illustrated embodiment. Tube 18, valve seat 15 and plug 45 cooperate to define inner chamber 27 within the valve.

Outer tube 21 is arranged concentric with tube 18 and in sealing engagement with recess portion 20 in base 10. Tube 21 is provided with a radially extending rim 49 which is fastened to base 10 by a plurality of screw fasteners 50 (one of which is shown in FIG. 1). The upper end of tube 21 is closed by plug 52 whose lower surface bears against plug 45 to force tube 18 and rim 23 of valve seat 15 firmly against base 10. In addition, tube 21 is provided with a plurality of radially extending abutments 54 which engage and position tube 18 relative thereto.

Solenoid 60 is disposed about and concentric with tube 21 and is longitudinally positioned by spacer 61. The coil is protected and retained in position by generally cylindrical housing 63 which is held in position by cover plate 65. Plug 52 is provided with external threads that are engaged by nut 66 to fixedly retain the assembly together as a unit and connections to solenoid 60 are established through wires 68.

In order to provide the third controlled fluid passageway, port C is provided in body member 10 and is connected by drilled passageway 70 to annular passageway 71, defined by the lower end of tube 21 and recess portion 20, and second chamber 72, defined between tube 18 and tube 21. Plug 45 is provided with diametrical groove 74 which extends between chamber 72 and drilled passageway 75, also provided in plug 45 and extending into first chamber 27 through valve seat 76. Plunger 40 is provided with an insert 78, similar in construction to insert 46, for sealing engagement with valve seat 76.

In the preferred embodiment, the operating efficiency of solenoid 60 is improved by providing a non-magnetic insert 80 as part of tube 18 and a non-magnetic insert 81 as part of tube 21. Thus, energization of solenoid 60 causes the magnetic flux to pass through plunger 40 and across the air gap between plunger 40 and plug 45 so as to move plunger 40 against the force of spring 47 and bring insert 78 into sealing engagement with valve seat 76.

It is therefore seen that, in the illustrated preferred embodiment of my improved valve, port A is normally closed and port C communicates with port B through drilled passageway 70, second chamber 72 (the annular passageway between tubes 18 and 21), groove 74, passageway 75 and inner chamber 27. Because plunger 40 is of lesser diameter than the inside diameter of tube 18, the fluid or gas from passageway 75 passes down around plunger 40, through passageways 26 to annular chamber 25, into drilled passageways 33 and 34 and out through port B. When the solenoid is energized, plunger 40 is raised so as to engage valve seat 76 and close drilled passageway 75 to close port C. Port A then communicates directly through drilled passageways 30 and 31 to inner chamber 27 and then to annular chamber 26, drilled passageways 33 and 34 and out through port B.

From the foregoing description of the construction and operation of my improved valve, it is apparent that solenoid 60 can be removed from the valve structure simply by removing nut 66 and so as to permit removal of solenoid 60 and plate 65 as a unit. This removal operation does not disturb any of the connections to ports A, B and C nor does it require disconnection of fluid passageways within the valve structure.

The improved arrangement of concentric tubes 18 and 21 not only simplifies the construction of my improved valve so as to reduce manufacturing costs, but also provides a symmetrical arrangement of solenoid 60 and plunger 40. The magnetic force exerted on plunger 40 will thus be substantially symmetrical thereby making plunger 40 self-centering within tube 18. In addition, no unnecessary air gaps are inserted in the magnetic circuit so as to reduce the efficiency of solenoid 60.

As will be apparent to persons skilled in the art, various modifications and adaptations of the structure above described will become readily apparent without departure from the spirit and scope of the invention the scope of which is defined in the appended claims.

I claim:

1. A three-way solenoid valve assembly comprising a body, a first tube closed at one end and having its other end supported on and in sealing engagement with said body to form a first chamber, a first port formed in said body and communicating with said first chamber through a first valve seat, a second port formed in said body and communicating with said first chamber, a second tube sealed at one end disposed about said first tube in concentric radially spaced relationship therewith, means supporting the other end of said second tube on said body thereby to form a second chamber between said tubes, a third port formed in said body and communicating with said second chamber, a passageway in said first tube extending between said second chamber and said first chamber and including a second valve seat disposed in said first chamber opposite to said first valve seat, a plunger movable in opposite directions in said first chamber and having first and second valve closure means carried on opposite ends thereof to engage said first and second valve seats, said plunger cooperating with said first tube to form a fluid passageway extending between said first valve seat and said second valve seat, a spring urging said plunger toward one of said valve seats, and a solenoid disposed about said second tube to effect movement of said plunger against the force of said spring.

2. A three-way solenoid valve assembly comprising a body, a pair of tubes closed at one end disposed one about the other in concentric radial spaced relation and having their open ends supported on said body in sealing engagement therewith, first and second ports formed in said body and communicating with the inner tube, said first port having a valve seat associated therewith and disposed in the chamber defined by the inner tube and said body, a third port formed in said body member and communicating with the chamber formed between said pair of tubes, a passageway formed in the closed end of the inner tube and communicating with the chamber between said tubes, a second valve seat disposed in said passageway and facing said first valve seat, a plunger positioned within the inner tube and cooperating therewith to form a fluid passageway extending from said second valve seat to said first and second ports, a spring disposed in the inner tube and urging said plunger into sealing engagement with one of said valve seats, and a solenoid operable to move said plunger against the force of said spring and into sealing engagement with the other said valve seat.

3. A three-way solenoid valve assembly comprising a body, a first tube closed at one end and having its other end supported on and in sealing engagement with said body to form a first chamber, a first port formed in said body and communicating with said first chamber through a first valve seat, a second port formed in said body communicating with said first chamber, a second tube sealed at one end disposed about said first tube in concentric radially spaced relationship therewith, means supporting the open end of said second tube on said body to form a second chamber between said tubes, a third port formed in said body and communicating with said second chamber, a passageway extending between said second chamber and said first chamber and including a second valve seat disposed in said first chamber opposite to said first valve seat, a plunger of lesser diameter than said first tube disposed in said first chamber for movement toward and away from said body, said plunger having first and second resilient valve closure members carried on opposite ends thereof for engagement with said first and second valve seats, a spring urging said plunger toward said first valve seat, and a solenoid disposed about said second tube in concentric relationship therewith to effect movement of said plunger toward said second valve seat.

References Cited in the file of this patent

UNITED STATES PATENTS

| | | |
|---|---|---|
| 2,296,132 | Wisely | Sept. 15, 1942 |
| 2,656,856 | Brunberg | Oct. 27, 1953 |
| 2,886,063 | Ray | May 12, 1959 |